United States Patent
Niv et al.

(10) Patent No.: US 12,301,045 B2
(45) Date of Patent: May 13, 2025

(54) ZERO RETURN PHOTOELECTRIC CONTROL SYSTEM

(71) Applicant: ST Engineering Telematics Wireless Ltd., Holon (IL)

(72) Inventors: Nehemia Niv, Petach Tikva (IL); Moshe Nissim, Ness Ziona (IL)

(73) Assignee: ST Engineering Telematics Wireless Ltd., Holon (IL)

( * ) Notice: Subject to any disclaimer, the term of this patent is extended or adjusted under 35 U.S.C. 154(b) by 449 days.

(21) Appl. No.: 17/731,332

(22) Filed: Apr. 28, 2022

(65) Prior Publication Data

US 2023/0352960 A1    Nov. 2, 2023

(51) Int. Cl.
   *H02J 7/00*     (2006.01)
   *H01H 47/24*    (2006.01)
   *H01H 47/26*    (2006.01)
   *H02J 7/34*     (2006.01)

(52) U.S. Cl.
   CPC ....... *H02J 7/007188* (2020.01); *H01H 47/24* (2013.01); *H01H 47/26* (2013.01); *H02J 7/345* (2013.01); *H02J 2207/10* (2020.01); *H02J 2207/20* (2020.01); *H02J 2207/50* (2020.01)

(58) Field of Classification Search
   CPC .. H02J 7/007188; H02J 7/345; H02J 2207/10; H02J 2207/20; H02J 2207/50; H01H 47/24; H01H 47/26
   USPC ........................................................ 320/137
   See application file for complete search history.

(56) References Cited

U.S. PATENT DOCUMENTS

| | | | | |
|---|---|---|---|---|
| 2,755,392 A | * | 7/1956 | Garnick | F21V 23/00 D13/165 |
| 3,816,745 A | * | 6/1974 | Primm | B66B 13/26 250/221 |
| 5,621,256 A | * | 4/1997 | Crane | H01R 13/641 307/125 |
| 5,680,035 A | * | 10/1997 | Haim | G05F 1/573 323/280 |

(Continued)

FOREIGN PATENT DOCUMENTS

| CN | 2753094 Y | 1/2006 |
|---|---|---|
| CN | 203534701 U | 4/2014 |

(Continued)

OTHER PUBLICATIONS

English Abstract of KR101842480 downloaded from Google Patents on Jul. 7, 2022.

(Continued)

*Primary Examiner* — M Baye Diao
(74) *Attorney, Agent, or Firm* — Heidi M. Brun (57) ABSTRACT

A system controls high power devices according to ambient light levels. The system includes a latching relay, a latching relay driver, an ambient light sensor and a relay bulk power supply. The latching relay switches power on and off to the high power devices, and the latching relay driver energizes the latching relay, using power from on-periods when the latching relay is closed. The ambient light sensor controls when the latching relay driver energizes the latching relay, and the relay bulk power supply stores power from the on-periods to be used to energize the latching relay during off-periods when the latching relay is open.

16 Claims, 9 Drawing Sheets

(56) References Cited

U.S. PATENT DOCUMENTS

| | | | |
|---|---|---|---|
| 7,583,130 B2* | 9/2009 | Meany | G11C 5/14 |
| | | | 327/530 |
| 8,305,783 B2* | 11/2012 | Rizzo | H02H 9/002 |
| | | | 363/53 |
| 9,418,809 B2* | 8/2016 | Hausman, Jr. | H05B 39/088 |
| 11,277,065 B2* | 3/2022 | Niv | H02M 7/06 |
| 2011/0148204 A1* | 6/2011 | DiMarco | H02J 9/062 |
| | | | 307/65 |
| 2013/0040471 A1* | 2/2013 | Gervais | H05B 47/11 |
| | | | 439/56 |
| 2019/0379278 A1 | 12/2019 | Niv | |

FOREIGN PATENT DOCUMENTS

| | | | |
|---|---|---|---|
| CN | 110748827 A | 2/2020 | |
| CN | 211297092 U | 8/2020 | |
| CN | 211531391 U | 9/2020 | |
| EP | 3843505 A1 * | 6/2021 | H05B 45/36 |
| GB | 2519445 A | 4/2015 | |
| KR | 101842480 B1 | 3/2018 | |

OTHER PUBLICATIONS

English Abstract of CN2753094 downloaded from Google Patents on Jul. 7, 2022.
English Abstract of CN203534701 downloaded from Google Patents on Jul. 7, 2022.
English Abstract of CN211531391 downloaded from Google Patents on Jul. 7, 2022.
English Abstract of CN211297092 downloaded from Google Patents on Jul. 7, 2022.
English Abstract of CN110748827 downloaded from Google Patents on Jul. 7, 2022.

* cited by examiner

ZERO RETURN PHOTOELECTRIC CONTROL SYSTEM

FIELD OF THE INVENTION

The present invention relates to photoelectric switches generally and to high power photoelectric switches in particular.

BACKGROUND OF THE INVENTION

Photoelectric cells, also known as photocells or photovoltaic cells, work on the principle of the photoelectric effect, and convert light energy into electrical energy. Such photoelectric cells can be used in a photoelectric switch that operates according to the ambient light conditions at the photoelectric cell. The amount of light falling on the photocell 'eye,' or lens, of the switch will determine the status of the switch, either 'on' or 'standby.'

High power photoelectric switches are used to control street lighting, turning them on when the ambient light falls below a determined switch-on level, and then turning them off when the ambient light level is above a determined switch-off level.

Figure 1:
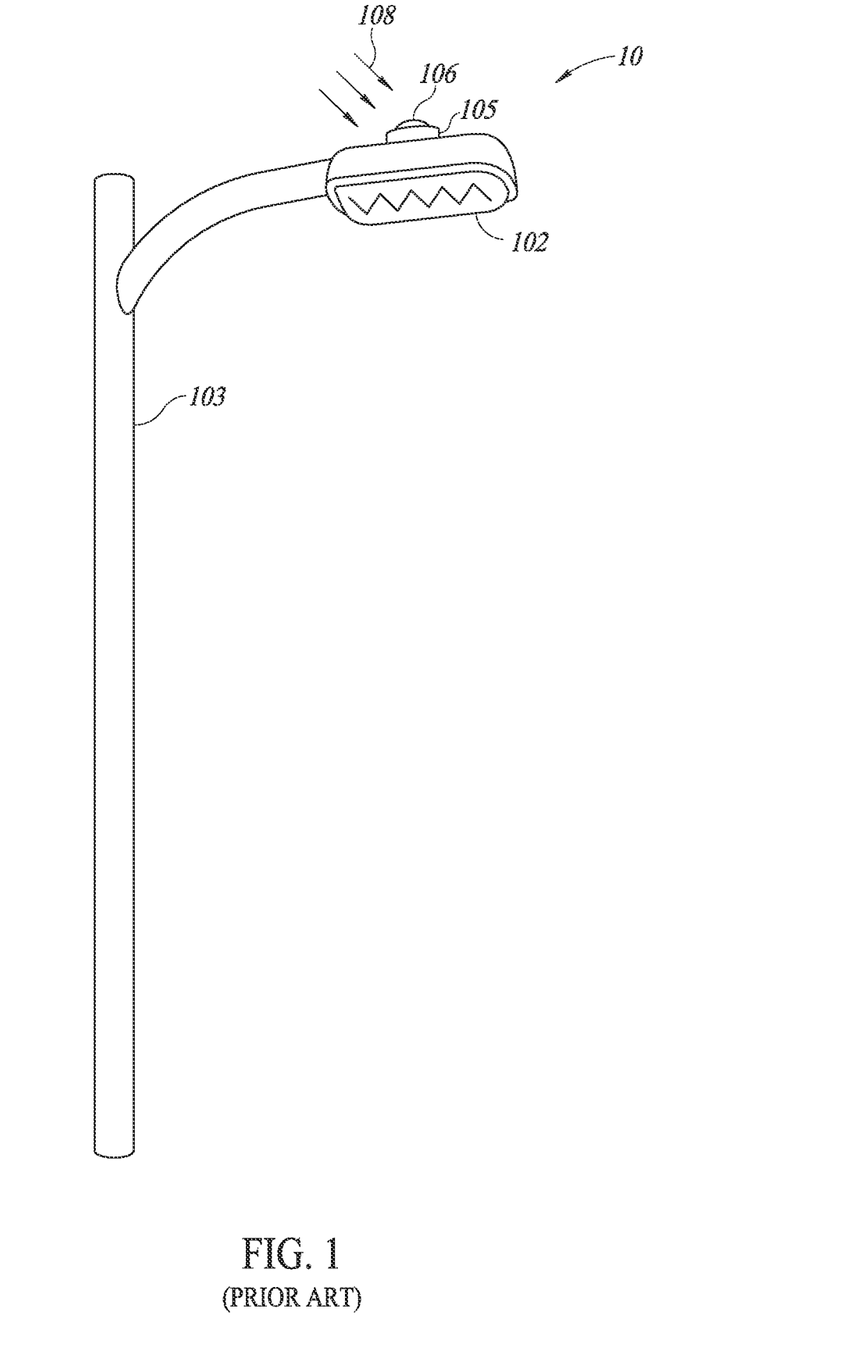
FIG. 1 is a schematic illustration of a prior art street light controlled by a photoelectric switch.

Reference is made to FIG. 1 which is a schematic illustration of a street light 10 controlled by a high-power photoelectric switch. Street light 10 has a light 102 mounted on a light pole 103, and a photoelectric controller 105 with a photoelectric eye 106 also mounted on light pole 103 or on light 102. Light 102 is turned on and off by photoelectric controller 105, according to ambient light level 108.

Street lighting accounts for significant energy costs of a city. Using photoelectric switches to control such street lighting, gives flexibility to switch street lighting on and off depending on the actual ambient light levels, as well as saving energy compared to other solutions such as time-switches. However, photoelectric controller 105 consumes energy even when street light 102 is off. This is known as the 'standby power consumption.' In general, standby energy consumption is responsible for over 5% of the total world's electricity consumption, according to the IEA (International Energy Agency). The standby power consumption of current photoelectric controllers 105 is around a few hundred milliwatts, but can reach several watts. According to IEC 62301:2011—Household electrical appliances—Measurement of standby power—Clause 4.5: measurements of less than 5 mW during standby are considered zero power consumption, and as such, a controller 105 with a standby power consumption of less than 5 milliwatts across all operating voltage and temperature ranges is defined as 'zero standby' controller.

SUMMARY OF THE PRESENT INVENTION

There is therefore provided, in accordance with a preferred embodiment of the present invention, a system to control high power devices according to ambient light levels. The system includes a latching relay, a latching relay driver, an ambient light sensor and a relay bulk power supply. The latching relay switches power on and off to the high power devices, and the latching relay driver energizes the latching relay, using power from on-periods when the latching relay is closed. The ambient light sensor controls when the latching relay driver energizes the latching relay, and the relay bulk power supply stores power from the on-periods to be used to energize the latching relay during off-periods when the latching relay is open.

Moreover, in accordance with a preferred embodiment of the present invention, the latching relay driver includes a first capacitor and a comparator. The first capacitor stores power during the on-periods, and the comparator monitors a level of power stored in the relay bulk power supply, and stops the latching relay driver from energizing the latching relay until the level of power is above a first predefined threshold value.

Further, in accordance with a preferred embodiment of the present invention, the ambient light sensor includes a light dependent resistor, and a negative temperature coefficient thermistor. The light dependent resistor changes a first resistance according to ambient light levels, and the negative temperature coefficient thermistor stabilizes operation across a predefined temperature range by changing a second resistance according to temperature.

Still further, in accordance with a preferred embodiment of the present invention, the system also includes a dual phase power supply that trickle charges the relay bulk power supply during the off-periods and fast charges the relay bulk power supply during the on-periods.

Additionally, in accordance with a preferred embodiment of the present invention, the dual phase power supply includes a dual phase rectifier connected to a first electrically isolated alternating current input phase and a second electrically isolated alternating current input phase. The dual phase rectifier converts the first electrically isolated alternating current input phase into a first constant current direct current output for trickle charging, and converts the first electrically isolated alternating current input phase and the second electrically isolated alternating current input phase into a second constant current direct current output for fast charging.

Moreover, in accordance with a preferred embodiment of the present invention, the relay bulk power supply includes a second capacitor and a thermistor. The second capacitor stores the power, and the thermistor limits the level of power stored in the second capacitor to a second predefined threshold value.

Further, in accordance with a preferred embodiment of the present invention, the latching relay driver includes a plurality of switches and a delay circuit. The plurality of switches and a delay circuit add a delay between the plurality of switches, and control the connection of an output of the relay bulk power supply and a ground.

Still further, in accordance with a preferred embodiment of the present invention, the delay circuit includes two falling edge triggered monostable vibrators in series, with calibrated output pulse widths.

Moreover, in accordance with a preferred embodiment of the present invention, the latching relay driver is a failover-to-on circuit that sets the latching relay to closed if a third level of power to the latching relay driver falls below a third predefined threshold value during the off-periods.

Additionally, in accordance with a preferred embodiment of the present invention, the system is a zero-standby device.

There is also provided, in accordance with a preferred embodiment of the present invention, a method to control high power devices according to ambient light levels. The method includes switching power on and off to a load using a latching relay, energizing the latching relay using only power from on-periods when the latching relay is closed, controlling when the energizing takes place, and storing power from the on-periods in a relay bulk power supply to be used for energizing the latching relay during off-periods when the latching relay is open.

Further, in accordance with a preferred embodiment of the present invention, energizing includes second storing power in a first capacitor during the on-periods, monitoring a level of power stored in the relay bulk power supply, and stopping the energizing until the level of power is above a first predefined threshold value.

Still further, in accordance with a preferred embodiment of the present invention, controlling includes changing a first resistance of a light dependent resistor according to ambient light levels, and stabilizing operation across a predefined temperature range by changing a second resistance of a negative temperature coefficient thermistor according to temperature.

Moreover, in accordance with a preferred embodiment of the present invention, storing includes trickle charging the relay bulk power supply during the off-periods, and fast charging the relay bulk power supply during the on-periods.

Additionally, in accordance with a preferred embodiment of the present invention, trickle charging includes converting a first electrically isolated alternating current input phase to a dual phase power supply into a first constant current direct current output for the trickle charging.

Further, in accordance with a preferred embodiment of the present invention, fast charging includes converting the first and a second electrically isolated alternating current input phases to a dual phase power supply into a second constant current direct current output for the fast charging.

Still further, in accordance with a preferred embodiment of the present invention, storing includes first storing power in a second capacitor, monitoring a level of power in the second capacitor, and limiting the level of power stored in the second capacitor to a second predefined threshold value.

Moreover, in accordance with a preferred embodiment of the present invention, the method includes adding a delay between a plurality of switches controlling connection of an output of the relay bulk power supply and a ground.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that current high power photoelectric street lighting controllers are complex, expensive to produce, consume significant power during standby, and are unreliable.

Applicant has realized that the two essential functions that require power during standby mode are ambient light monitoring and switch actuation.

Applicant has also realized that the power required for switch actuation during standby mode may be 'borrowed' from power used during on mode, thus reducing standby power consumption.

Current controller designs require complex control systems to manage switch actuation and power circuits. Applicant has realized that a controller circuit may be implemented using simpler logic, controlling a simpler power circuit.

Figure 2:
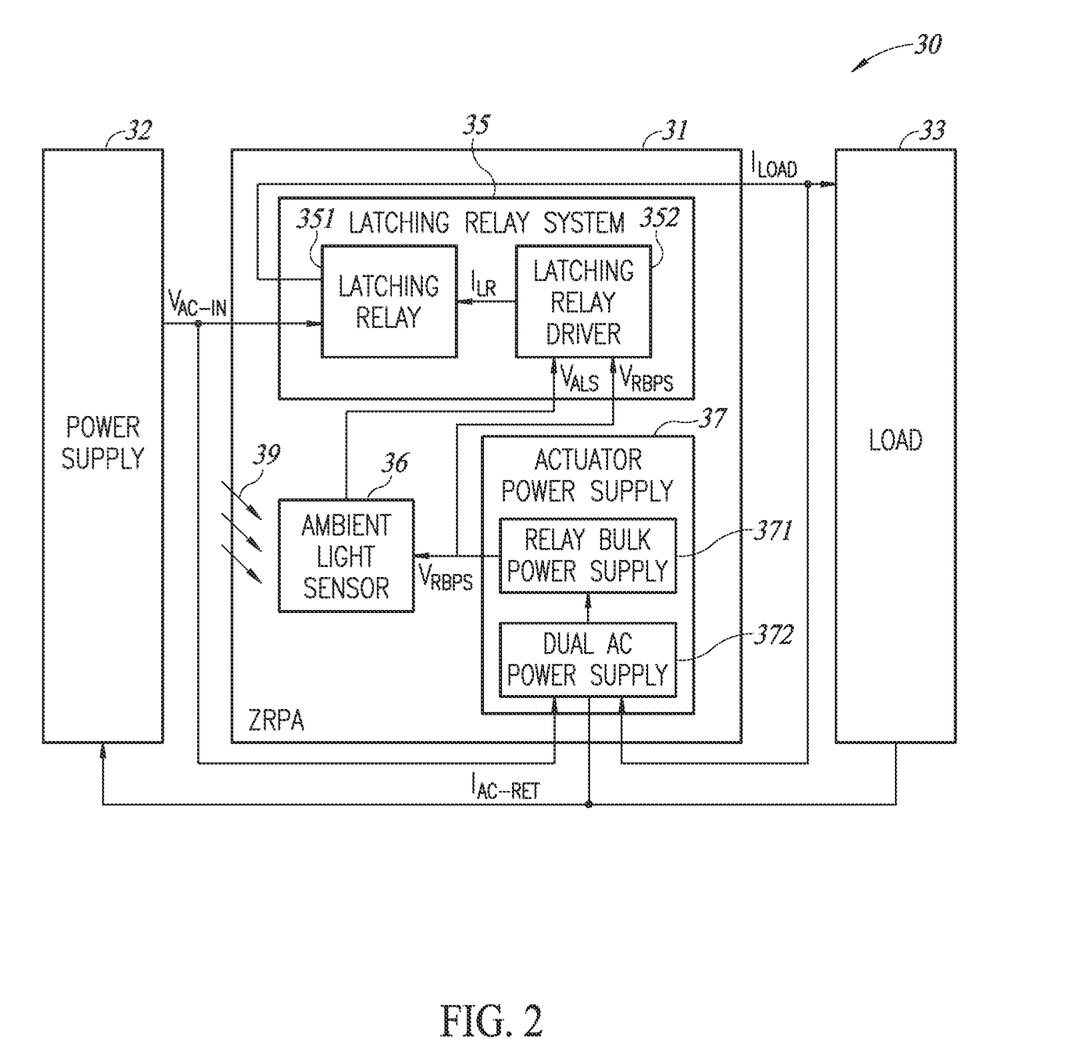
FIG. 2 is a schematic illustration of a zero-return photoelectric actuator system.

Reference is made to FIG. 2 which is a schematic illustration of a zero current return photocell actuator (ZRPA) system 30. ZRPA system 30 comprises a ZRPA 31, a power source 32, and a load 33. Power source 32, which may be the mains power supply, may be connected to the input of ZRPA 31. Load 33, which may be a streetlight, may be connected to the output of ZRPA 31. ZRPA 31 may comprise a latching relay system 35, an ambient light sensor 36 sensing ambient light input 39, and an actuator power supply 37. Latching relay system 35 further comprises a latching relay driver 352 and a latching relay 351. Actuator power supply 37 further comprises a relay bulk power supply 351 and a dual AC power supply 372.

When the intensity of light input 39 to ambient light sensor 36 rises above a predetermined value $X_{ON}$, then ambient light sensor 36 may output a trigger signal $V_{ALS}$ to latching relay driver 352. Latching relay driver 352 may then energize latching relay 351, by switching on a current $I_{LR}$ to latching relay 351, equal to $I_{LR\text{-}OFF}$, in order to change ZRPA 31 from an on mode wherein latching relay 351 may be closed, to a standby mode wherein latching relay 351 may be open. When latching relay 351 opens, current $I_{LOAD}$ flowing through load 33 may be disconnected. In such a case, a street light may switch from on to off.

When the intensity of light input 39 to ambient light sensor 36 falls below a predetermined value, $X_{OFF}$, then ambient light sensor 36 may change trigger signal $V_{ALS}$ to $V_{ALS-OFF}$ to latching relay driver 352. Latching relay driver 352 may then energize latching relay 351, by switching on current $I_{LR}$ to latching relay 351, equal to $I_{LR-OFF}$, in order to change ZRPA 31 from standby mode to on mode. When latching relay 351 closes, current $I_{LOAD}$ may flow through load 33. In such a case, a street light may switch from off to on.

The time period when the state of relay system 351 may transition from open-to-closed, or may transition from closed-to-open, may be referred to as a 'transitional mode' or in a 'transitional state.' In contradistinction, the time periods during which ZRPA 31 is in a stable standby state, or stable on state, may be described as an 'operational mode' or an 'operational state.'

Stand-By Mode

As mentioned hereinabove, the two essential functions that require power during standby mode are ambient light monitoring by ambient light sensor 36 and switching latching relay 351 from open to closed. During standby mode, the amount of current required by ambient light sensor 36 to monitor ambient light level 39 and to trigger latching relay driver 352, may be $I_{ALS}$. The amount of current required by latching relay driver 352 to energize latching relay 351 may be $I_{LR-ON}$. Other current used by ZRPA 31 which may be lost to 'system losses' may be $I_{SYSTEMLOSSES}$. The total input current used by ZRPA 31 during standby mode, which may be equal to the current on the return of power supply 32, $I_{AC-RET}$ during standby mode, and may be referred to as $I_{AC-IN-STDBY}$, where $I_{AC-IN-STDBY}$ may be defined as in equation 1:

$$I_{AC-IN-STDBY} = I_{ALS} + I_{LR-ON} + I_{SYSTEMLOSSES} \quad (1)$$

where $I_{ALS}$ may be the standby current required by ALS 36, $I_{LR-ON}$ may be the current required to switch energize latching relay 351, and $I_{SYSTEMLOSSES}$ may represent system losses.

It will be appreciated that ZRPA 31 may be designed to minimize system current loss $I_{SYSTEMLOSSES}$ to be insignificant compared to the combination of ambient light current $I_{ALS}$ and latching relay current $I_{LR-ON}$. As explained hereinbelow, Applicant has realized that $I_{LR-ON}$ may be 'borrowed' from the on mode of ZRPA system 30, hence standby current $I_{AC-IN-STDBY}$ may now approximate $I_{ALS}$. It will be appreciated that through efficient ambient light sensor 36 design, and limiting $I_{ALS}$ to a few milliamps, ZRPA system 30 may be a zero-standby device.

On-Mode

Relay bulk power supply 371 may be implemented as a bulk capacitor to store energy to operate latching relay system 35 and ambient light sensor 36. When ZRPA system 30 is in on mode, dual AC power supply 372 may fast charge relay bulk power supply 371, where the fast-charging current $I_{AC-RET}$ may be referred to as $I_{AC-IN-ON}$, so that when ZRPA system 30 switches to standby mode, energy stored by relay bulk power supply 371 may then be used to power latching relay driver 352 and to energize latching relay 351. When ZRPA system 30 is in standby mode or in on mode, then relay bulk power supply 371 may constantly provide power to ambient light sensor 36. It will be appreciated that by powering ambient light sensor 36 via relay bulk power supply 371, the complexity of the design of actuator power supply 37 may be reduced. When ZRPA system 30 is in standby mode, dual AC power supply 372 may continually trickle charge to relay bulk power supply 371 with a trickle charge current equal to $I_{AC-IN-STBY}$.

The time taken for dual AC power supply 372 to charge relay bulk power supply 372 from empty to full, $T_{LATCHCHARGE}$, may be from tens of minutes up to several hours since dual AC power supply 372 may only trickle charge relay bulk power supply 371 when ZRPA system 30 is in standby mode. As the off-to-on cycle may take place once a day, and dual AC power supply 372 may have a 12 hour period to charge, the charging time $T_{LATCHCHARGE}$ may not be a limiting factor. However, manufacturers are required to perform mandatory testing, which may require many hundreds or thousands of power cycles to be performed in a time period not reflective of the operational environment. During such testing, a charging time of $T_{LATCHCHARGE}$ of many hours may become a significant issue, and may limit the ability of manufacturers to perform such tests.

Applicant has realized that by using a second, higher current AC input to dual AC power supply 372 during testing to increase supplied current to $I_{AC-IN-ON}$, dual AC power supply 372 may fast charge relay bulk power supply 371 during on states. Fast charging may significantly reduce charge time $T_{LATCHCHARGE}$, and testing may be performed in an acceptable period of time.

ZRPA

Figure 3:
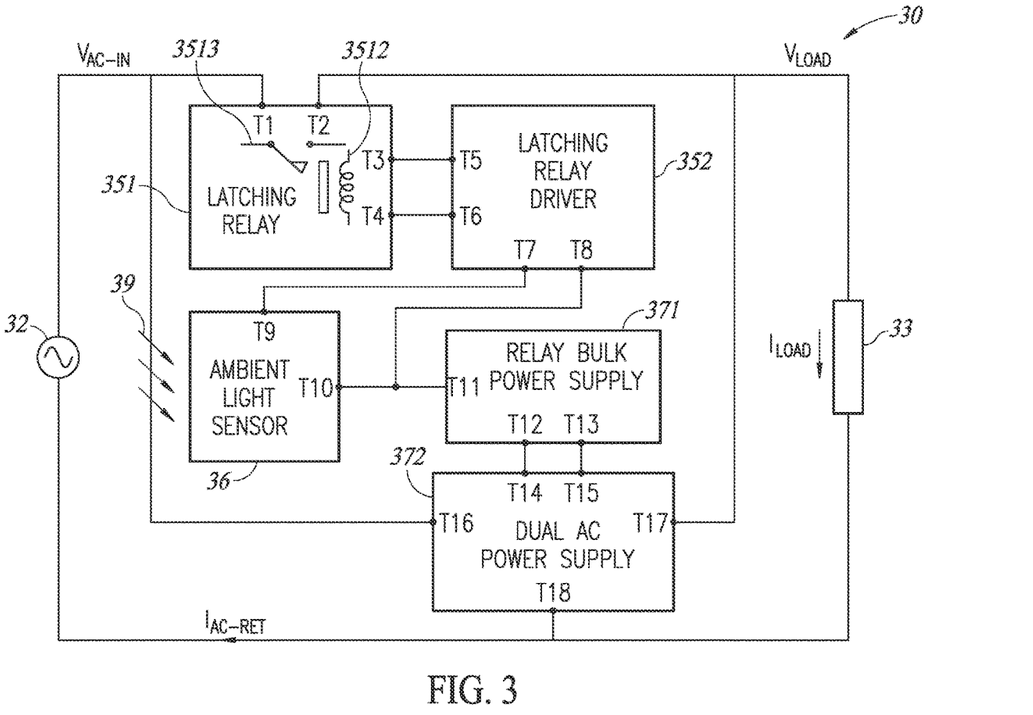
FIG. 3 is an exemplary circuit diagram of the zero-return photoelectric actuator system of FIG. 2.

Reference is now made to FIG. 3 which is an exemplary circuit diagram of ZRPA system 30, showing power supply 32, latching relay 351, latching relay driver 352, ambient light sensor 36, relay bulk power supply 371, dual AC power supply 372 and load 33. FIG. 3 additionally shows the elements of latching relay 351, which comprises an energizing coil 3512, and a latch 3513. ZRPA 31 also comprises terminals T1 thru T18.

Latching Relay

Latching relay 351 may be used to switch power supply $V_{AC-IN}$ from power supply 32 on terminal T2, providing a switched power supply to load 33, and also a switched second power input to dual AC power supply 372. Energizer coil 3512 of latching relay 351 may be between terminals T3 and T4, which may be connected to output terminals T5 and T6 of latching relay driver 352. In the current embodiment of the present invention, latching relay 351 may be a single coil device, such that the relay may be opened and closed by a low-to-high voltage transition, or a high-to-low voltage transition, depending on the particular device selected.

There are two main latching relay topologies used in such a driver: a single polarity energy source—wherein a positive polarity pulse and a negative polarity pulse are used to switch the latching relay between an open state and a closed state; and, a bipolar energy source—wherein two voltage sources are used to switch the latching relay between an open state and a closed state. It will be appreciated that a single or multicoil latching relay may be used for latching relay 351.

Ambient Light Sensor

Figure 4:
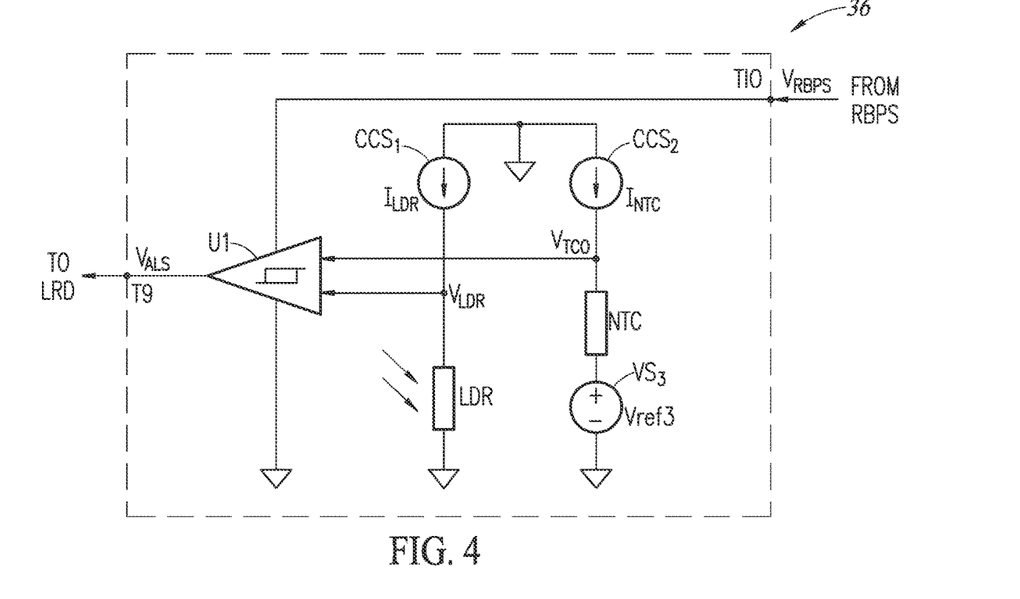
FIG. 4 is an exemplary circuit diagram of the ambient light sensor of the zero-return photoelectric actuator system of FIG. 2.

Reference is now made to FIG. 4 which illustrates the circuit diagram of ambient light sensor 36 sensing ambient light input 39. Ambient light sensor 36 comprises a comparator U1, a light dependent resistor LDR, a first constant current source $CCS_1$, a negative temperature coefficient thermistor NTC, a second constant current source $CCS_2$, and a variable dc voltage source $VS_3$.

Light dependent resistor LDR and constant current source $CCS_1$ may be connected to a first input of comparator U1. Negative temperature coefficient thermistor NTC, constant current source $CCS_2$, and a variable dc voltage source $VS_3$ may be connected to a second input of comparator U1. Comparator U1 may be powered by a DC voltage $V_{RBPS}$ from relay bulk power supply 371 on terminal T10. Comparator U1 may output trigger voltage $V_{ALS}$ of ambient light sensor 36 on terminal T9 that connects to latching relay driver 352.

Comparator U1 may compare voltage $V_{LDR}$ on a first input of comparator U1 and voltage $V_{TCO}$ on a second input of comparator U1, and may output a trigger voltage $V_{ALS}$ depending on their difference. On first input of comparator U1, voltage $V_{LDR}$=Current $I_{LDR}$*resistance $R_{LDR}$, where current $I_{LDR}$ is generated by current source $CCS_1$, and resistance $R_{LDR}$ is the resistance of light dependent resistor LDR and is dependent on light level 39.

Although it is desirable that light dependent resistor LDR change resistance $R_{LDR}$ only depending on ambient light level 39, in reality, the resistance $R_{LDR}$ of light dependent resistor LDR may also have a temperature dependence. Therefore temperature variations may cause $V_{LDR}$ to change. Accordingly, the second input of comparator U1 may be connected to voltage $V_{TCO}$ which may vary according to temperature and thus, may be used to correct for the thermal dependence of resistor LDR. Correction voltage $V_{TCO}$ may be calculated according to equation 2:

$$V_{TCO}=(I_{NTC}*R_{NTC})+V_{REF3} \qquad (2)$$

where current $I_{NTC}$ is generated by current source $CCS_2$, $R_{NTC}$ is from thermistor NTC and is dependent on ambient temperature, and $V_{REF3}$ is a voltage offset generated by voltage source VS3.

The voltage drop $V_{NTC}$ across thermistor NTC may be calculated to change in the same direction as the temperature dependence in resistor LDR, such that when there is a positive temperature dependent voltage drop across resistor LDR, there may be a corresponding positive voltage drop across thermistor NTC, thus compensating for temperature effects on resistor LDR and ALS 36.

Voltage $V_{REF3}$ may be varied to adjust the predefined ambient light levels $X_{ON}$ and $X_{OFF}$, which as mentioned hereinabove, are the ambient light levels 39 that may trigger ZRPA 31 to switch on and off respectively. It will be appreciated that hysteresis in comparator U1 may be used to adjust $X_{ON}$ and $X_{OFF}$, such that $X_{ON}$ and $X_{OFF}$ may be at different light levels 39.

It will also be appreciated that the design of ambient light sensor 36 as a simple analog detector may reduce complexity. Furthermore, ambient light sensor 36 may be designed such that current $I_{LDR}$ is low enough such that ZRPA system 30 may be a zero-standby device. Light dependent resistor LDR may consume less than 1 mW, negative temperature coefficient thermistor NTC may consume about 10 microwatts. It will also be appreciated that ambient light sensor 36 may also be a low duty cycle device. It will also be appreciated that, as a result, ambient light sensor 36 may have ultra-low power consumption which may be less than 1 milliwatt.

Actuator Power Supply

Figure 5:
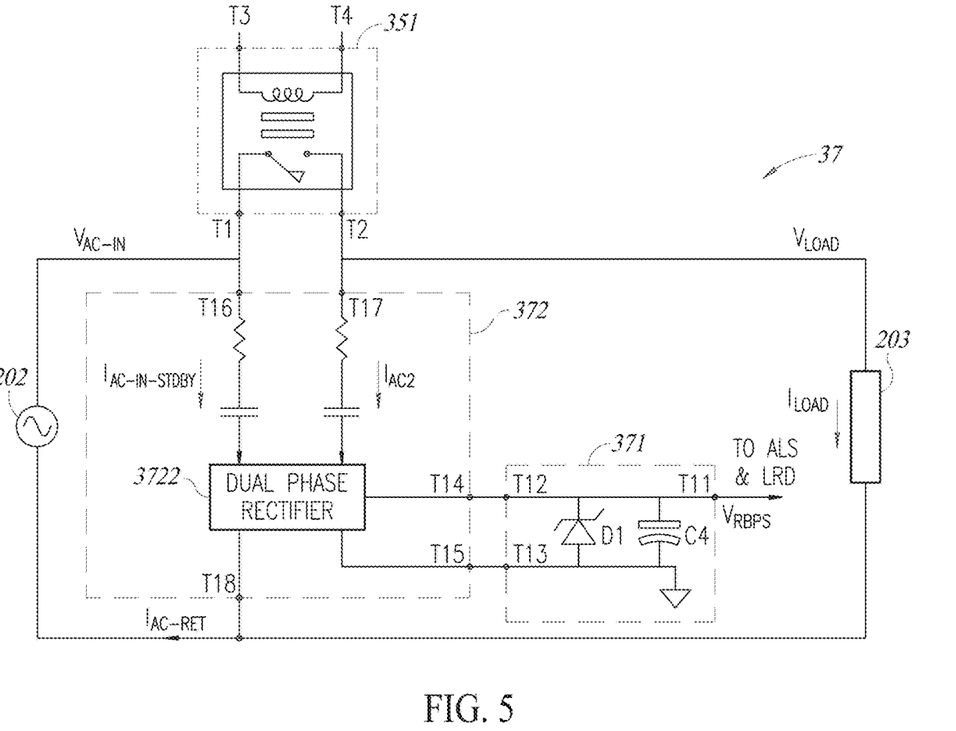
FIG. 5 is an exemplary circuit diagram of the actuator power supply of the zero-return photoelectric actuator system of FIG. 2.

Reference is now made to FIG. 5, which is an exemplary circuit diagram of actuator power supply 37. Dual AC power supply 372 may be a dual-phase input capacitive power supply, that charges relay bulk power supply 371 via one (in the case of trickle charging) or two (in the case of fast charging) of the input phases.

Dual AC power supply 372 comprises a dual phase rectifier 3722 with two fixed current input phases—phase 1 from power supply 32 between terminals T16 and T18, and phase 2 from load 33 between terminals T17 and T18. Phase 1 further comprises a resistor R1 and a capacitor C1. Phase 2 further comprises a resistor R2 and a capacitor C2.

Phase 1 may be always-on, supplying a constant trickle of current $I_{AC-IN-STBY}$ to dual phase rectifier 3722. Phase 2 may only be active when load 33 is active, providing an additional current $I_{AC2}$ such that dual phase rectifier 3722 may provide fast charging current $I_{AC-RET}$, where $I_{AC-RET}$ may be calculated according to equation 3:

$$I_{AC-RET}=I_{AC-IN-STBY}+I_{AC2} \qquad (3)$$

where $I_{AC-IN-STBY}$ may be the constant trickle of current during standby, and $I_{AC2}$ may be the additional charging current added for fast charging.

Phase 1 current $I_{AC-IN-STBY}$ may be limited to about 1 mW by capacitor C1 with a value of about 1 nF. Phase 2 current $I_{AC2}$ may be limited to about 10 mW by capacitor C2 with a value of about 10 nF. Capacitors C1 and C2 have low enough capacitance such that, at standard powerline frequencies of 50 Hz or 60 Hz, they may exhibit high reactive resistance. Capacitor C1 may exhibit an impedance of about 3k ohms, and capacitor C2 may exhibit an impedance of about 30k ohms. Such high resistance may cause each of the inputs to act as a constant current sink, and hence, may regulate the input current into and out of dual phase rectifier 3722. Dual phase rectifier 3722 may be susceptible to damage from high in-rush currents on both of the inputs, and therefore, resistor R1, with a value of about 1k ohms, may limit input current $I_{AC-IN-STBY}$, and resistor R2, with a value of about 1k ohms, may limit input current $I_{AC2}$. The power dissipated across resistor R1 may be insignificant to the power through input phase 1, as current $I_{AC-IN-STBY}$ may be so low. The power dissipated across resistor R2 may be much higher than that across resistor R1, but may be insignificant compared to the power used by load 33. Dual phase rectifier 3722 may isolate between Phase 1 input and Phase 2 input, so as to keep the input and the output of latching relay switch 3723 isolated.

Relay bulk power supply 371 comprises a capacitor C4 and a Zener diode D1. As mentioned hereinabove, relay bulk power supply 371 may be charged by dual AC power supply 372. When voltage $V_{RBPS}$ in relay bulk power supply 371 reaches $V_{D1}$, capacitor C4 may be charged and any excess charging current may be dissipated by Zener diode D1 as heat. In on mode, such power as is dissipated as heat in Zener diode D1 is not significant compared to the power dissipated through load 33. It will be appreciated that dual AC power supply 372 may be a dual-phase AC power supply that may convert two independently isolated single phases into a DC output current. It will also be appreciated that during standby mode, the power dissipated by Zener diode D1 may become significant if it is too high compared to the power used by ambient light sensor 36. For this reason, the power supplied by dual AC power supply 372 in standby mode may be calibrated to be very close to the power requirement of ambient light sensor 36. In another embodiment, charge to relay bulk power supply 371 may be limited by an active rectifier circuit rather than Zener diode D1, in which case Zener diode D1 may be present only as a safety device in case such an active rectifier circuit fails.

Latching Relay System

Figure 6A:
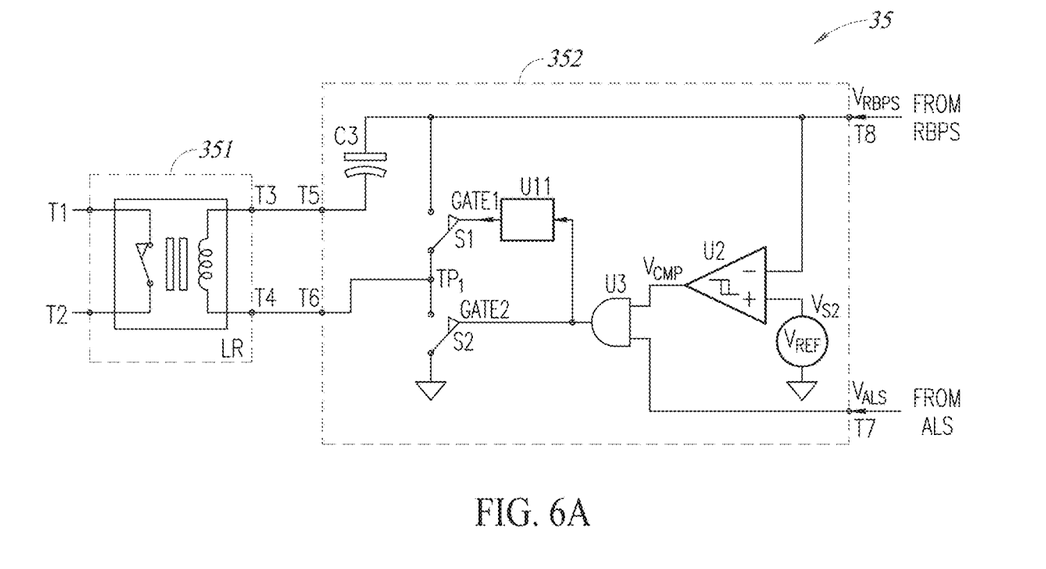
FIGS. 6A, 6B, and 6C are circuit diagram illustrations of the latching relay system of the zero-return photoelectric actuator system of FIG. 2 in three states.
Figure 6B:
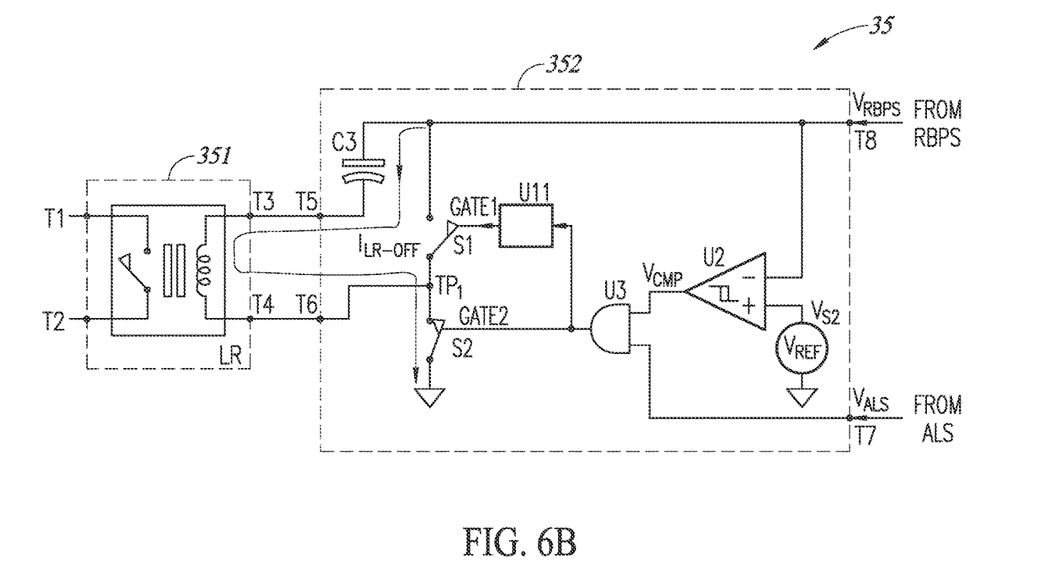
Figure 6C:
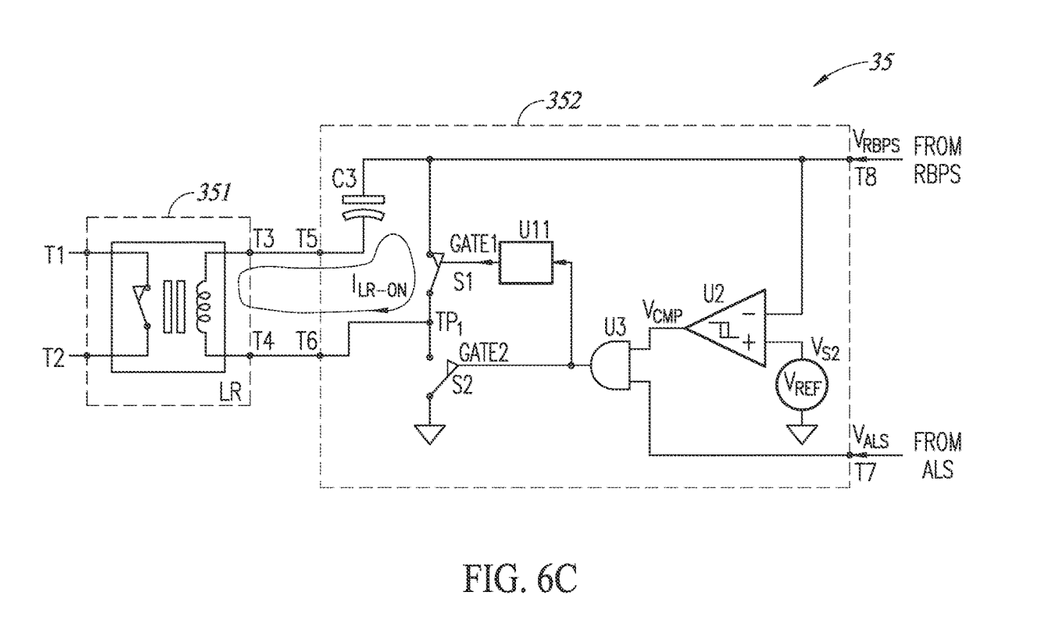

Reference is now made to FIGS. 6A, 6B, and 6C which illustrate latching relay system 35, which comprises latching relay driver 352 connected to latching relay 351, in three states. As shown in the circuit diagrams of FIGS. 6A, 6B and 6C, latching relay driver 352 comprises a comparator U2, an AND gate U3, a time delay circuit U11, a switch 1 and a switch 2.

FIG. 6A shows latching relay system 35 in an 'uninitialized' state, when latching relay 351 may be closed, and switches S1 and S2 may be open, such as before power supply 32 is initially connected to ZRPA 31. FIG. 6B shows latching relay system 35 when ZRPA 31 is connected to power, and is switching from uninitialized to standby mode. In this state, switch S1 may be open, and switch S2 may be closed, causing latching relay 351 to be opened. FIG. 6C shows latching relay system 35 when ZRPA 30 is switched from standby mode to on mode. In this state, switch S1 may be closed and switch S2 may be opened, causing latching relay 351 to be closed.

Timing Diagrams

Figure 7A:
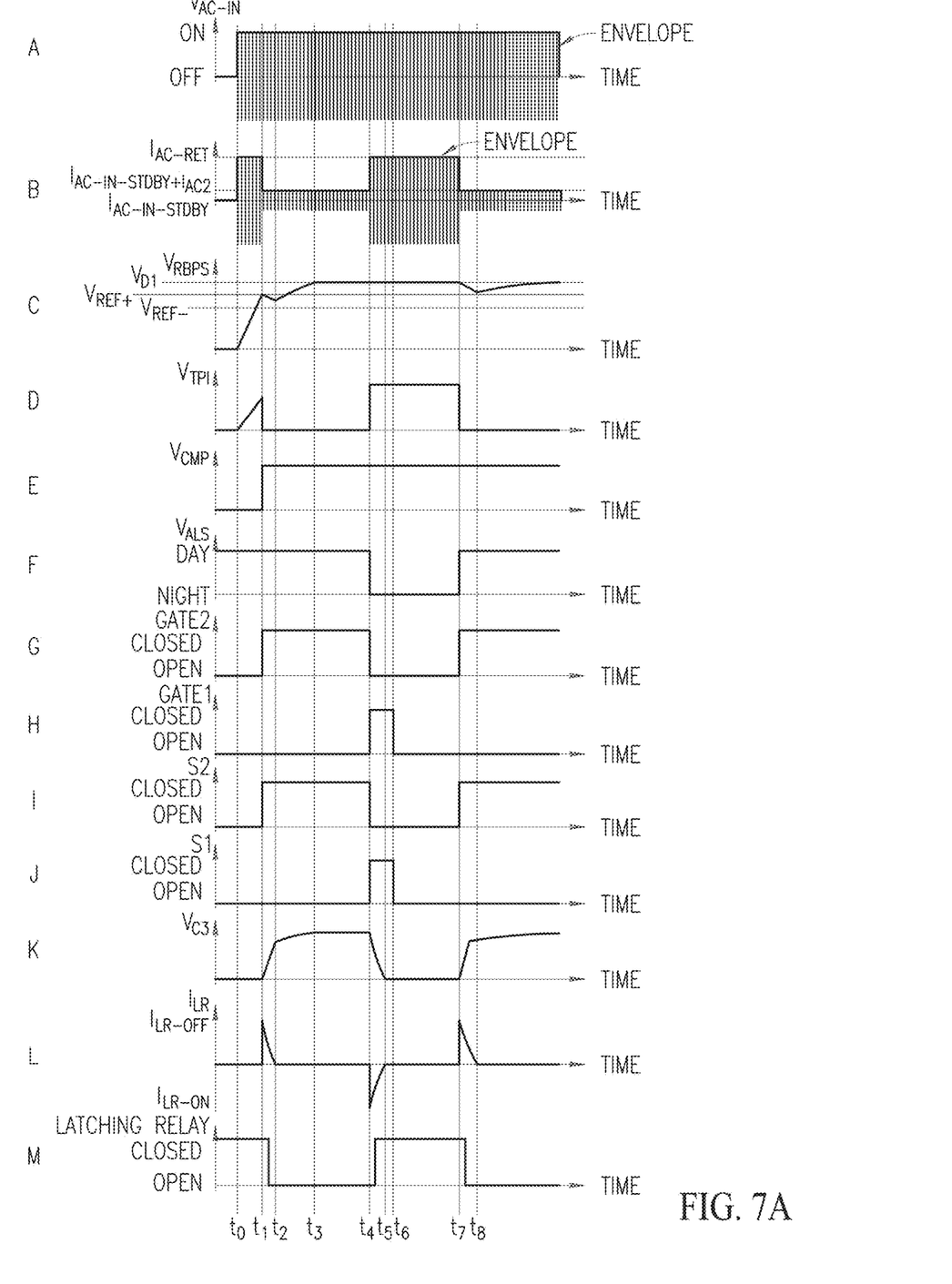
FIG. 7A is a timing diagram illustration detailing the regular operation of the zero-return photoelectric actuator system of FIG. 2.
Figure 7B:
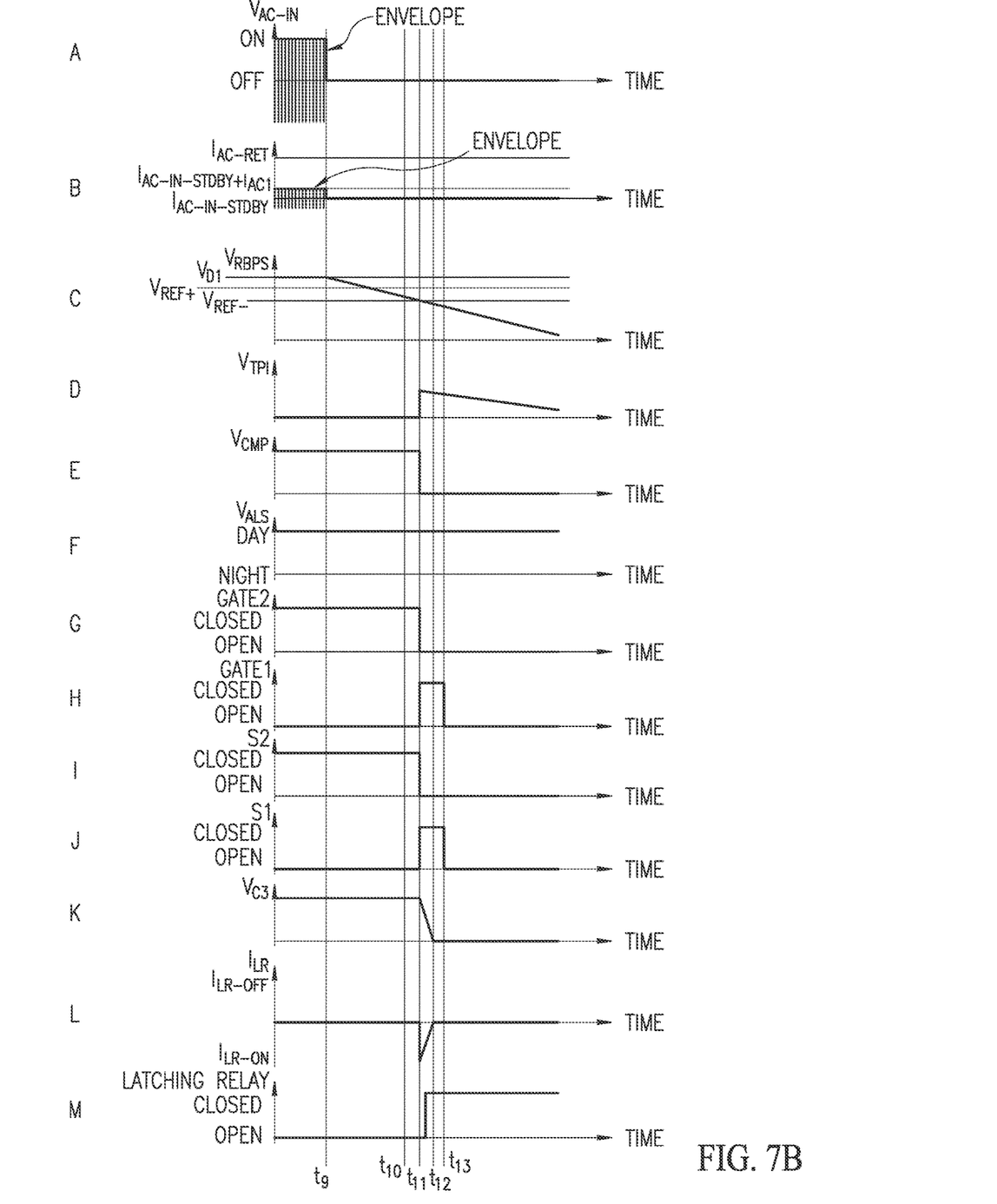
FIG. 7B is a timing diagram illustration detailing the 'failover-on-off' operation of the zero-return photoelectric actuator system of FIG. 2.
Figure 7C:
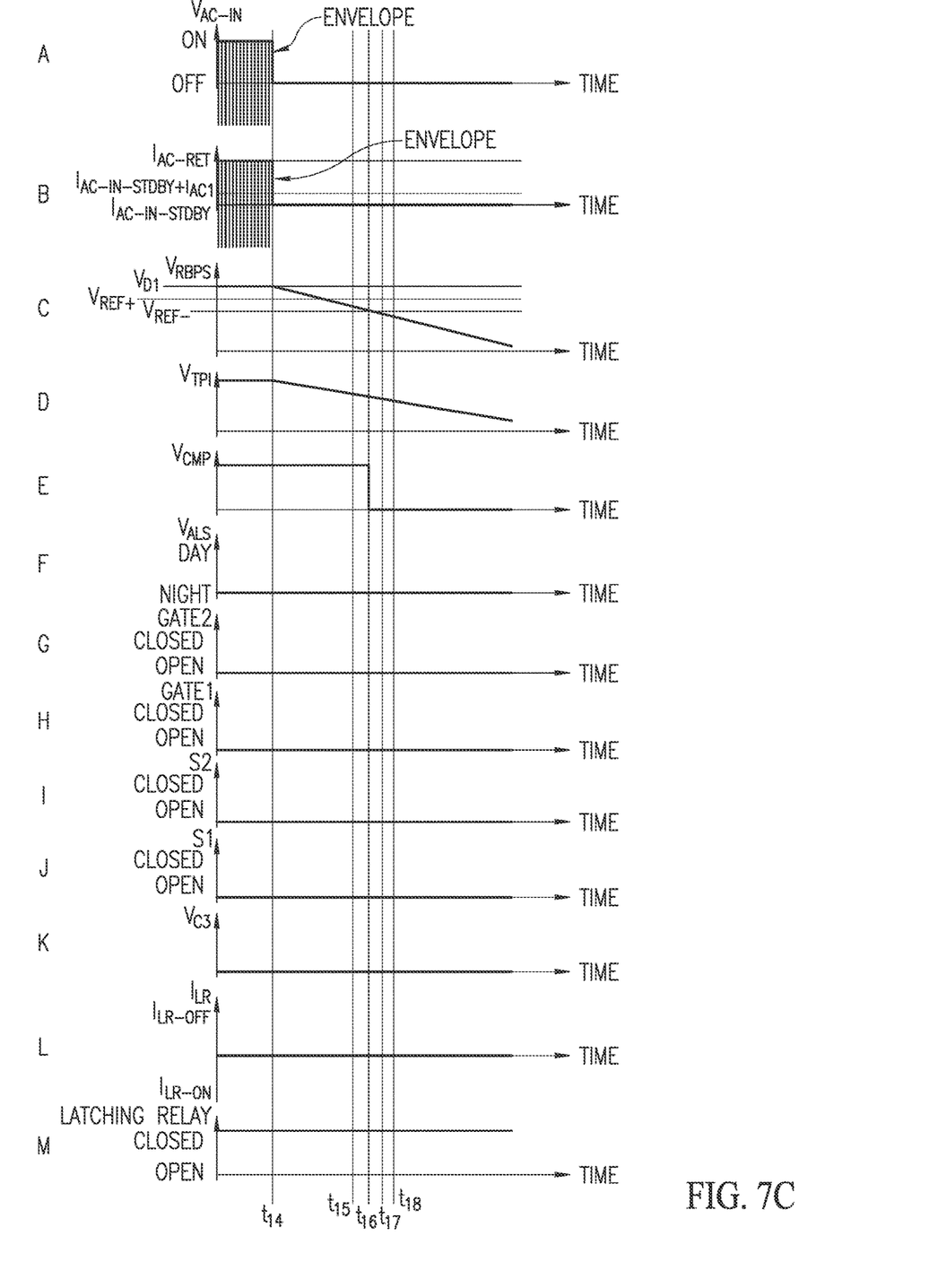
FIG. 7C is a timing diagram illustration detailing the 'failover-on-on' operation of the zero-return photoelectric actuator system of FIG. 2.

Reference is now made to FIGS. 7A, 7B and 7C, which are timing diagrams detailing the operation of latching relay system 35.

Timing diagram A shows voltage $V_{AC-IN}$ into dual AC power supply 372 from AC power supply 32—either on or off; timing diagram B shows current $I_{AC-RET}$ into dual AC power supply 372—either $I_{AC-IN-STBY}$ (when trickle charging relay bulk power supply 371) or $I_{AC-IN-STBY}+I_{AC2}$ (when fast charging relay bulk power supply 371); timing diagram C shows DC voltage levels $V_{RBPS}$ on relay bulk power supply 371—which is between zero and a maximum of $V_{D1}$ (and also noting two other reference voltage levels $V_{REF+}$ and $V_{REF-}$); timing diagram D shows the voltage level $V_{TP1}$ at Test Point 1 (TP1)—which is between zero and $V_{D1}$; timing diagram E shows the output voltage $V_{CMP}$ of comparator U2 in dual AC power supply 372—which is either a logical low or a logical high; timing diagram F shows the output voltage $V_{ALS}$ of ambient light sensor 36—which is either a logical high (during the day) or a logical low (during the night); timing diagram G shows the output of AND gate U3, Gate2, in latching relay driver 352—which is either a logical low or a logical high; timing diagram H shows the output of delay circuit U11, Gate1, in latching relay driver 352—which is either a logical low or a logical high; timing diagram I shows the state of switch S2 in latching relay driver 352—which is either open or closed; timing diagram J shows the state of switch S1 in latching relay driver 352—which is either open or closed; timing diagram K shows the voltage $V_{C3}$ across capacitor C3 in latching relay driver 352—which is between zero and $V_{D1}$; timing diagram L shows the current $I_{LR}$ through the energizing coil of latching relay 351—which is between $I_{LR-OFF}$ and $I_{LR-ON}$; timing diagram M shows the state of the output latch of latching relay 351—which is either open or closed.

FIGS. 7A, 7B and 7C detail a number of time points t0 thru t18, which will be used to explain the operation of ZRPA 30. These time points broadly define boundaries between a number of time periods. The timing diagrams in FIGS. 7A thru 7C will now be used to explain the operation of latching relay system 35. When referring to a timing diagram, the timing diagram reference letter is shown in brackets, for example {A}.

Operation

Prior to t0—latching relay system 35 is in the 'uninitialized' state—such as before installation. In this state (such as during manufacture), latching relay 351 may be set to closed and switches S1 and S2 are set to open, as they require power to be set to closed.

From t0 to t1—latching relay system 35 transitions from the 'uninitialized' to an 'initialized' state when ZRPA 30 is connected to power source 32 {A} at t0. At this point, relay bulk power supply 371 {C} may be fast charged by dual AC power supply 372, as both inputs to dual AC power supply 372 may be connected to power 32, and current $I_{AC-RET}$ may equal to $IA_{C-IN-STBY}+I_{AC2}$ {B}. If voltage $V_{REF}$ rises above voltage $V_{RBPS}$, then the output of comparator U2, $V_{CMP}$, {E} may become a logical false. If $V_{CMP}$ is a logical false, then this may indicate that there is not enough energy stored in relay bulk power supply 371 for the operation of latching relay 351, and latching relay system 35 may enter a waiting state. During the waiting state, the state of latching relay 351 may not be changed. If $V_{RBPS}>=V_{REF}$, then the output of comparator U2, $V_{CMP}$, is a logical true. When output $V_{CMP}$ is a logical true, then this may indicate that there is enough energy stored in relay bulk power supply 371 for the operation of latching relay 351. Dual AC power supply 372 may continue charging relay bulk power supply 371 until $V_{RBPS}$ reaches $V_{REF+}$ (this is the threshold value of $V_{REF}$ when charging relay bulk power supply 371 from zero) at t1. When $V_{RBPS}$ reaches $V_{REF+}$, then comparator U2 outputs a logical true voltage $V_{CMP}$ {E}, and latching relay system 35 may exit the waiting state, and the system may now energize coil 3512 at which point latching relay system 35 is initialized.

From t1 to t2—latching relay system 35 transitions from the 'initialized' to the 'standby' state—as output $V_{CMP}$ {E} is a logical true, and output $V_{ALS}$ {F} is a logical true then AND gate U3 may output a logical true {G} that results in the closure of switch S2 {I}.

From t2 to t4—latching relay system 35 is in standby mode—relay bulk power supply 371 {C} may be trickle charged by dual AC power supply 372, as the second input to dual AC power supply 372 is removed when latching relay 351 {M} opens, and $I_{AC-RET}$ drops to $I_{AC-IN-STBY}$ {B}. Dual AC power supply 372 may continue charging until voltage $V_{RBPS}$ reaches $V_{D1}$ by t3. Likewise voltage $V_{C3}$ may also reach $V_{D1}$ by t3. Latching relay system 35 is now in standby mode.

From t4 to t6—latching relay system 35 transitions from standby state to on state—at t4 light level 39 may fall below $X_{OFF}$, causing trigger voltage $V_{ALS}$ to change from a logical true to a logical false {F}. This may cause AND gate U3 {G} to output a logical low, which in turn may cause switch S2 {I} to open, and may cause delay circuit U11 to output a logical high and close S1 {J}. Latching relay system 35 is now in on mode.

From t6 to t7—latching relay system 35 is in stable on mode—voltage $V_{RBPS}$ is maintained at $V_{D1}$ by trickle charge from dual AC power supply 372.

From t7 to t8—latching relay system 35 transitions from on state to standby state—at t7, light level 39 may rise above $X_{ON}$, causing output $V_{ALS}$ to change from a logical false to a logical true {F}. This may cause AND gate U3 {G} to output a logical high, which in turn may cause switch S2 {I} to close. Latching relay system 35 may now switch into standby mode in a similar manner to that explained in the transition from t1 to t2 hereinabove.

Failover

Photoelectric street light controllers are required to switch into an on state in the case of a power failure. This is known as 'failover to on.' This requires controllers to have systems to ensure that the switch status can be changed from off to on, even in the case of a power failure.

Latching relay system 35 may have a fail-over mode which causes switch 3512 of latching relay 351 to be 'forced' into the closed position in the event of a power failure. FIG. 7B is a timing diagram detailing the operation of latching relay system 35 during a failover during standby mode.

Prior to t9—latching relay system is in standby mode—voltage $V_{RBPS}$ {C} and voltage $V_{C3}$ {K} are at $V_{D1}$ as shown.

From t9 to t13—latching relay system 35 transitions from 'standby' to 'failover' state—in the event of a power failure at t9, power supply 32 {A} may be disconnected and trickle charging {B} of ambient light sensor 36 may stop. Ambient light sensor 36 may still draw power from relay bulk power supply 371, causing voltage $V_{RBPS}$ to fall from $V_{D1}$. When $V_{RBPS}$ falls below $V_{REF-}$ (the value of $V_{RBPS}$ during standby mode below which ZRPA 31 is deemed to be in failover mode) at t10, then output $V_{CMP}$ {E} may become a logical false, causing latching relay driver 352 to close switch 3513 of latching relay 351, similar to the transition between t4 and t5. The only difference is that the voltage $V_{TP1}$, {D} will continue to track the fall in voltage $V_{RBPS}$. This failover leaves latching relay system 35 with the correct settings to allow it to reinitialize or recover when power 32 is restored.

FIG. 7C is a timing diagram illustration detailing the operation of latching relay system 35 during a failover during on mode. It will be appreciated that prior to t14—latching relay system 35 is in on mode and during on mode, latching relay 351 is already closed.

From t14 to t18—in contradistinction, when latching relay system 35 transitions from 'on' to 'failover' state and from t18—latching relay system 35 is in failover mode. It will be appreciated that at time t14, latching relay system 35 is already set up to recover when power is restored, and no further activity may be required.

It will be appreciated that $V_{REF+}$ and $V_{REF-}$ may be set at different levels by adjusting the hysteresis of comparator U2, which may result in $X_{ON}$ and $X_{OFF}$ at different ambient light levels.

Short Avoidance

It will be appreciated that if switch S1 and switch S2 close at exactly the same time, a short circuit will be created between the output of relay bulk power supply 371 and ground. Applicant has realized that by putting an asymmetrical delay (a different time delay for switch S2 transitioning from on-to-off and off-to-on) between activating switch S1 and activating switch S2, switch S1 and switch S2 may not be closed simultaneously.

Figure 8A:
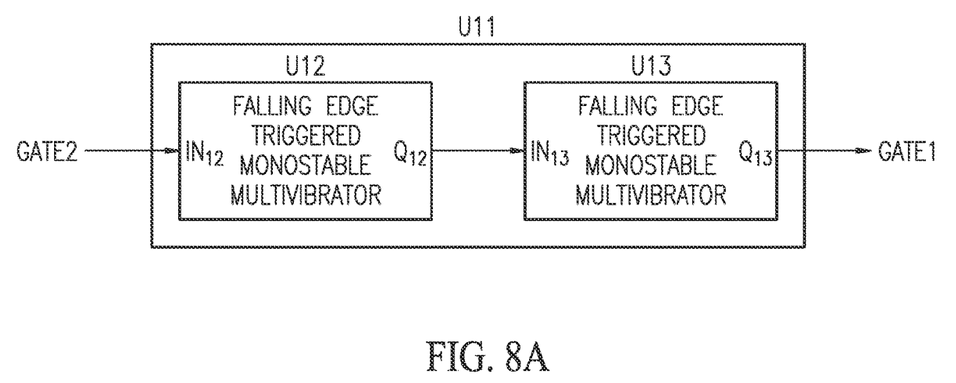
FIG. 8A is a schematic illustration of the delay circuit of the latching relay system of FIGS. 7A, 7B, and 7C.

Reference is made to FIG. 8A which is an exemplary circuit diagram of delay circuit U11, comprising two falling edge triggered monostable vibrators (FETMM) U12 and U13 in series. The input of FETMM U12 is $IN_{12}$ and the output of is $Q_{12}$. The input of FETMM U13 is $IN_{13}$ and the output of is $Q_{13}$. An FETMM operates by outputting a positive pulse of a predetermined pulse width, when a high-to-low voltage is input.

Figure 8B:
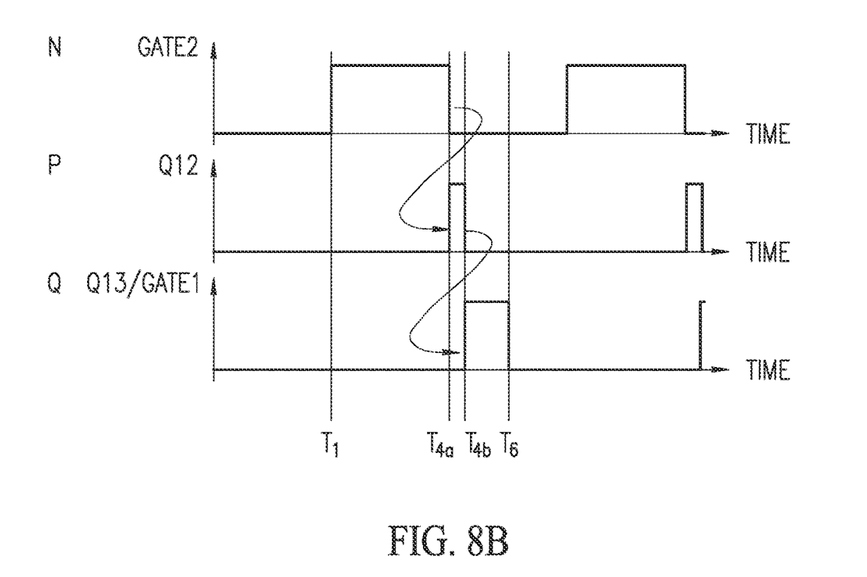
FIG. 8B is a timing diagram illustration detailing the operation of the delay circuit of FIG. 8A.

Reference is now made to FIG. 8B which is an exemplary timing diagram illustration detailing the operation of the delay circuit U11. Timing diagram N shows the input $IN_{12}$ which is connected to the output of AND gate U3. The value of $IN_{12}$ is equal to Gate2, which drives switch S1 and has a value of either a logical high or logical low; timing diagram P shows the output of FETMM U12, $Q_{12}$—which is either a logical high or a logical low; and timing diagram Q shows the output of FETMM U13, $Q_{13}$ which is equal to output Gate1—which is either a logical high or a logical low.

It will be appreciated that when output Gate 2 {N} falls, it causes a pulse on the output $Q_{12}$ of FETMM U12 {P}. The falling edge of that pulse {P} may trigger FETMM U13 {Q} to output a second pulse on $Q_{13}$.

It will be appreciated that the pulse widths of both output pulses are calculated to ensure that latching relay system 35 may operate without switch S1 and switch S2 being closed at the same time, and hence may avoid a short circuit between the output of relay bulk power supply 371 $V_{RBPS}$ and ground.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system to control high power devices according to ambient light levels, the system comprising:
   a latching relay to switch power on and off to said high power devices;
   a latching relay driver to energize said latching relay, using power from on-periods when said latching relay is closed;
   an ambient light sensor to control when said latching relay driver energizes said latching relay; and
   a relay bulk power supply to store power from said on-periods to be used to energize said latching relay during off-periods when said latching relay is open,
   wherein said latching relay driver comprises:
     a first capacitor to store power during said on-periods; and
     a comparator to monitor a level of power stored in said relay bulk power supply, and to stop said latching relay driver from energizing said latching relay until said level of power is above a first predefined threshold value.

2. The system of claim 1, said ambient light sensor comprises:
   a light dependent resistor to change a first resistance according to ambient light levels; and
   a negative temperature coefficient thermistor to stabilize operation across a predefined temperature range, wherein said negative temperature coefficient thermistor to change a second resistance according to temperature.

3. The system of claim 1 and also comprising a dual phase power supply to trickle charge said relay bulk power supply during said off-periods and to fast charge said relay bulk power supply during said on-periods.

4. The system of claim 3 and wherein said dual phase power supply comprises a dual phase rectifier connected to a first electrically isolated alternating current input phase and a second electrically isolated alternating current input phase to convert said first electrically isolated alternating current input phase into a first constant current direct current output for said trickle charge, and to convert said first electrically isolated alternating current input phase and said second electrically isolated alternating current input phase into a second constant current direct current output for said fast charge.

5. The system of claim 1 wherein said relay bulk power supply comprises:
   a second capacitor to store said power; and
   a thermistor to limit said level of power stored in said second capacitor to a second predefined threshold value.

6. The system of claim 5 wherein said latching relay driver comprises a plurality of switches and a delay circuit to add a delay between said plurality of switches, to control connection of an output of said relay bulk power supply and a ground.

7. The system of claim 6 wherein said delay circuit comprises two falling edge triggered monostable vibrators in series, with calibrated output pulse widths.

8. The system of claim 1 wherein said latching relay driver is a failover-to-on circuit that sets said latching relay to closed if a third level of power to said latching relay driver falls below a third predefined threshold value during said off-periods.

9. The system of claim 1 wherein said system is a zero-standby device.

10. A method to control high power devices according to ambient light levels, the method comprising:
    switching power on and off to a load using a latching relay;
    energizing said latching relay, using only power from on-periods when said latching relay is closed;
    controlling when said energizing takes place; and
    storing power from said on-periods in a relay bulk power supply to be used for energizing said latching relay during off-periods when said latching relay is open,
    wherein said energizing comprises:
        second storing power in a first capacitor during said on-periods;
        monitoring a level of power stored in said relay bulk power supply; and
        stopping said energizing until said level of power is above a first predefined threshold value.

11. The method of claim 10 wherein said controlling comprises:
    changing a first resistance of a light dependent resistor according to ambient light levels; and
    stabilizing operation across a predefined temperature range by changing a second resistance of a negative temperature coefficient thermistor according to temperature.

12. The method of claim 10 wherein said storing comprises trickle charging said relay bulk power supply during said off-periods, and fast charging said relay bulk power supply during said on-periods.

13. The method of claim 12 and wherein said trickle charging comprises converting a first electrically isolated alternating current input phase to a dual phase power supply into a first constant current direct current output for said trickle charging.

14. The method of claim 12 and wherein said fast charging comprises converting said first and a second electrically isolated alternating current input phases to a dual phase power supply into a second constant current direct current output for said fast charging.

15. The method of claim 12 wherein said storing comprises:
    first storing power in a second capacitor;
    monitoring a level of power in said second capacitor; and
    limiting said level of power stored in said second capacitor to a second predefined threshold value.

16. The method of claim 10 further comprising adding a delay between a plurality of switches controlling connection of an output of said relay bulk power supply and a ground.

* * * * *